UNITED STATES PATENT OFFICE.

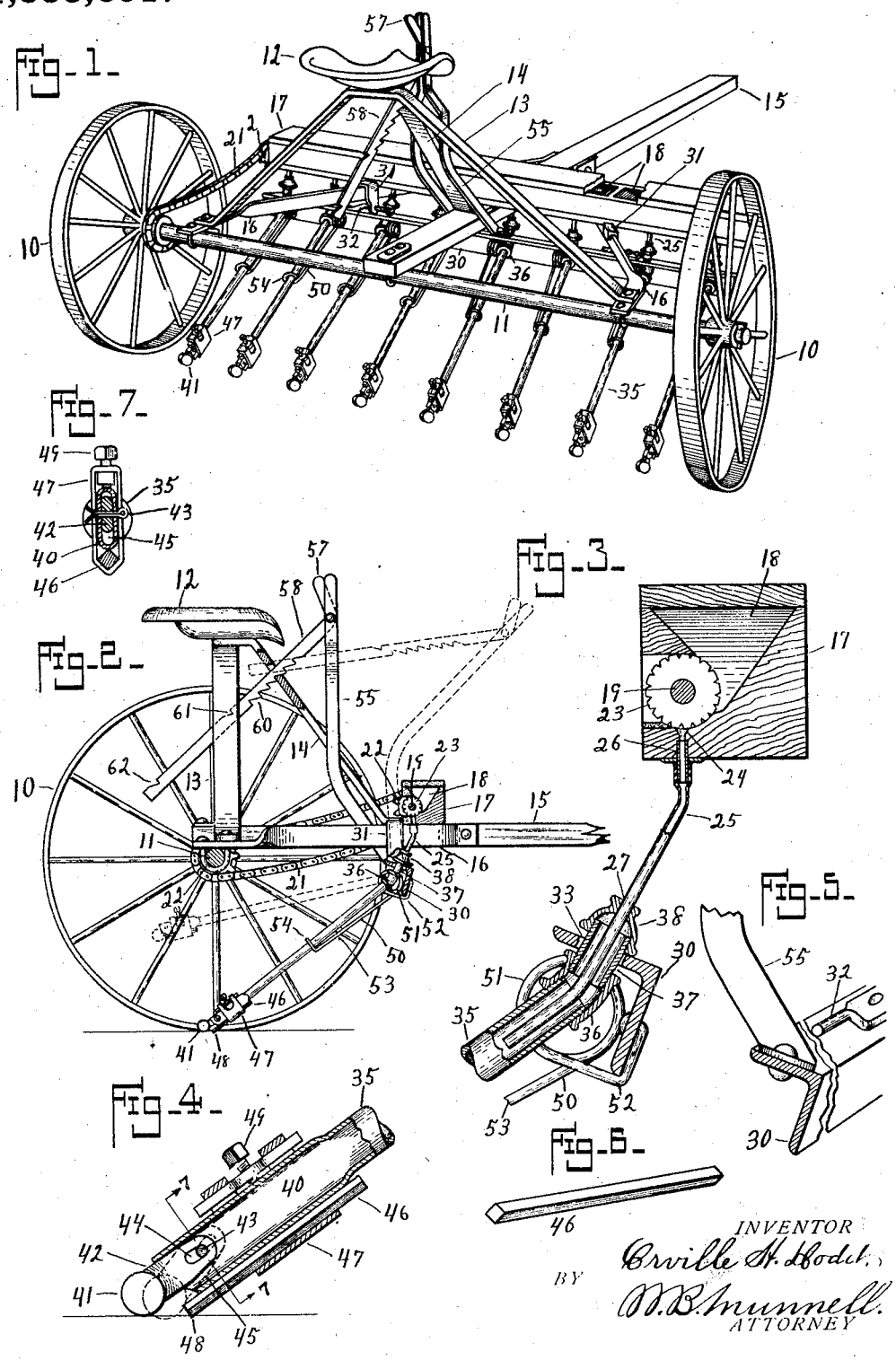

ORVILLE H. DODD, OF CHARLESTOWN, INDIANA.

SEED-PLANTER.

1,333,391.

Specification of Letters Patent.　　Patented Mar. 9, 1920.

Application filed November 7, 1919. Serial No. 336,509.

*To all whom it may concern:*

Be it known that I, ORVILLE H. DODD, a citizen of the United States, residing at Charlestown, county of Clark, and State of Indiana, have invented new and useful Improvements in Seed-Planters, of which the following is a specification.

This invention relates to a seed planting machine, and has for an object the provision of means, especially adapted for planting small seed such as clover seed, which embodies novel features of construction whereby the seed may be deposited in a furrow of the right depth and subsequently covered with loose soil and the soil properly compacted thereover.

Clover seeds are usually sown broadcast and are liable to be blown by currents of air so that some falls by the way side, some falls on stony ground and some falls on good ground, and that which falls on the good ground is apt to be thin in some spots, and too thick in other, with a resultant waste of seed and an uneven stand.

An object of this invention is to provide means for placing in the ground, under proper conditions for germination, all the seed sown.

A further object is the provision of means as characterized which will be economical in construction, efficient in operation and durable in service.

With the foregoing and other objects in view, the invention consists of the novel construction and arrangement of parts illustrated in the accompanying drawing, which forms a part of this specification, wherein is set forth an embodiment of the invention, but it is to be understood that such changes and modifications may be resorted to as come within the scope of the appended claims.

In the drawing wherein similar reference characters designate similar parts in the several views, Figure 1, is a perspective view of an embodiment of the invention: Fig. 2, a transverse section thereof: Fig. 3, a transverse section through the seed box and the upper portion of a seed tube partly in section: Fig. 4, a longitudinal section of the lower portion of a seed tube: Fig. 5, a sectional perspective detail: Fig. 6, a perspective view of a furrow opener, and Fig. 7, a cross section on line 7—7 of Fig. 4.

In the embodiment of the invention illustrated herewith a pair of wheels —10— are secured on the ends of an axle —11—, which preferably is of tubing for the sake of lightness. A seat —12— is supported by an arch bar —13— which is attached to the axle in proximity to the wheels. The seat is steadied by a brace —14— which leads downward and forward therefrom to a connection with a tongue —15—, the rear end of which is secured to the axle. A pair of hounds —16— secured respectively to the axle and to the tongue, serves to brace the latter against lateral movement. A seed box —17— positioned a spaced distance forward of and parallel with the axle, rests upon the tongue and hounds and is secured thereto by any suitable means. The seed box may be of any suitable construction, as illustrated its length is nearly that of the distance between the wheels, and it comprises a plurality of compartments —18—, which converge to an opening in the lower portion of the rear wall. A shaft —19— extends the full length of the box and carries on a projecting end thereof, a sprocket wheel —20— which is connected by means of a sprocket chain —21— with a sprocket wheel —22— on the hub, whereby when the wheel turns the shaft will be rotated. A plurality of toothed wheels —23— one for each compartment, are secured on the shaft and extend into the respective compartments. The arrangement being such that as the machine advances, the shaft with the associated toothed wheels will be rotated and seed contained within the compartments, which enter the spaces between the teeth, will be carried thereby to an opening —24— down which they will fall by gravity. By this arrangement, seed in successive, measured quantities will be dropped at regulated intervals into the opening 24. A supporting bar —30— is pivotally suspended from the hounds by suitable means, such as brackets —31— secured to and depending from the hounds and pintles —32— secured to the bar, and engaged in perforations in the brackets. The bar is preferably angular in cross section and its horizontal leg is provided with a plurality of perforations —33—, equal in number to the compartments in the seed box. A seed tube —35— depends through each perforation, being supported therein in such a manner as to be movable in every direction. The seed tube is of such length as to extend at a suitable angle from its connection with the angle bar to contact with the ground.

An angle pipe fitting —36— is secured on the upper end of the tube. A nipple —37— inserted in the angle and of less diameter than the perforation in the bar, extends therethrough, and is provided on its upper end with a cap —38—, the flange of which rests upon the upper surface of the bar, upholding the tube, and rocking thereon as the tube shifts its position. At the lower end of the tube, it is flattened out, or compressed laterally for a spaced distance from the end, forming a vertical chamber —40—. A presser foot, or covering member —41— is secured on the outer end of an arm —42— which extends into the chamber 40, and is retained therein by suitable means, such as a pin —43—, which passes through the side walls of the chamber and through a slot —44— in the arm. The arm normally when in service with the covering member resting on the ground, lies against the ceiling of the chamber leaving a passage —45— between it and the floor along which the seed may pass. When the seed tube is raised up so that the presser foot is clear of the ground, the arm will drop and close the passage thus preventing the exit of seed. And if the machine should be backed, while the presser foot is on the ground, the pressure against the ground will cause it to slide forward, on the pin, closing the entrance and thereby preventing the passage from being stopped up by the entrance of soil thereinto, (see Fig. 4). A bit, or furrow opener —46—, preferably formed of a length of tool steel, square in cross section, is held against the lower edge of the enlarged portion by suitable means such as a clamp —47—. The arrangement being such that a corner —48— of the bit will cut into the ground, and that it may be adjusted longitudinally by loosening a screw —49—, so that furrows of different depth may be opened. A resilient element —50— adapted to sustain the seed tube in a normal position relative to the angular bar, comprises a coiled portion —51—, a limb —52— secured to the angle bar, and an arm —53— which extends a spaced distance along the pipe and is slidably connected therewith by means of an encircling terminal —54—. A flexible duct, or hose —25— which is connected to a nipple —26— secured in the opening 24, in the seed box, extends through an opening —27— in the cup 38, on the upper end of the seed tube, into the tube and a space down the interior thereof. A pair of arms —55— secured to the angle bar on either side respectively of the tongue, curve upward and inward toward each other so that their upper ends lie close together and within easy reach of the driver's hand, forming a lever wherewith the angle bar may be rocked, or tilted. A ratchet lever, which comprises a short arm —57— and a long arm —58— disposed at an angle to each other, is pivotally secured between the arms 55 in such relationship thereto that the short arm 57 extends upward there between and may be grasped by the driver and actuated at the time he catches hold of the arms 55. The long arm 58, extends backward through a slot —59— in the brace 14, and is provided on its lower side, with a plurality of notches —60— adapted to be engaged with the lower edge of the slot and retain the arms 55 when they are drawn backward. It is also provided on its upper side with notches —61, 62— adapted to be engaged with the upper edge of the slot and hold the arms 55 when they are pushed forward. The normal position of the seed tubes, when the machine is in operation, is with the presser foot —41— resting upon and with the lower corners of the bits cutting into the ground. In this position, as illustrated in full lines in Fig. 2, the springs exert sufficient pressure to cause the bits to bite into soft ground. By pulling the arms 55, backward, the angle bar 30, may be rocked on its pivots thereby tightening the coils 51, of the springs and increasing the pressure of the bits upon the ground so that they will cut into harder ground. The spring insures contact of the seed tubes with the ground regardless of the movement of the frame, as the machines moves over uneven ground, and the manner in which the tubes are associated with the angle bar permits individual tubes to rise and fall in conformity with the contour of the ground and to swerve laterally to avoid obstructions in their path. The tubes should be of the lightest possible construction that contact with the ground may be maintained by the springs, spring pressure being more responsive than gravity. As the machine moves forward, the toothed wheels 23, feed seed into the seed ducts 25, which delivers them into the tubes 35, down which they roll to the outlet where they fall into the furrows, newly opened by the bits, and are immediately covered, and the soil compacted over them by the presser feet 41, while the soil is still fresh, thereby insuring that the seed is placed in the ground under the most favorable conditions.

Having thus described my invention so that those skilled in the art pertaining thereto can make and use the same, I claim:—

1. In a seed planter, a frame, a seed box carried thereby, a rockable bar suspended therefrom, a seed delivery tube suspended from said bar and capable of universal movement relative thereto, a resilient element connected respectively with the bar and with said tube and adapted to sustain the tube in a normal position relative to the bar, and a flexible duct leading from the seed box to the interior of the tube.

2. In a seed planter, a frame, a seed box carried thereby, a rockable bar suspended therefrom, a seed delivery tube suspended from said bar and capable of universal movement relative thereto, a resilient element connected respectively with the bar and with said tube and adapted to sustain the tube in a normal position relative to the bar, a flexible duct leading from the seed box to the interior of the tube, and means for feeding seed in successive measured quantities into said duct.

3. In a seed planter, a frame, a rockable bar associated therewith, a seed delivery tube suspended from said bar, yieldable means for holding said tube in a normal position relative to the bar, means for rocking the bar to cause the lower ends of the tube to contact with the ground, means for delivering seed into the tube, a member positioned in and extended from the free end of the tube, said member having a vertical and a longitudinal movement therein and a presser foot on the outer end of the member adapted to be contacted with the ground, whereby the member is actuated to control egress of seed from the tube.

4. In a seed planter, a frame, a rockable bar associated therewith, a seed delivery tube suspended from said bar, yieldable means for holding said tube in a normal position relative to the bar, means for rocking the bar to cause the lower ends of the tube to contact with the ground, means for delivering seed into the tube and a closure associated with the lower end of the tube adapted to be actuated by contact with the ground to permit egress of seed therefrom during forward movement of the planter and to be closed by a backward movement thereof.

5. In a seed planter, a frame, a seed box carried thereby, a rockable bar suspended therefrom, a seed delivery tube suspended from said bar and capable of universal movement relative thereto, a resilient element connected respectively with the bar and with said tube, and adapted to sustain the tube in a normal position relative to the bar, means for tilting the bar to cause the lower end of the tube to contact with the ground and means for increasing the tension of said resilient element to increase the pressure of the tube upon the ground.

6. In a seed planter, a frame, a tiltable supporting bar associated therewith provided with a hole, a nipple of less diameter than said hole extended therethrough, a cap on the upper end of said nipple, an elbow on the lower end of the nipple, a tube secured in said elbow, a closure associated with the free end of said tube, and a resilient element adapted to sustain the tube in a normal position relative to the bar.

7. In a seed planter, a frame, a tiltable supporting bar associated therewith provided with a hole, a nipple of less diameter than said hole, extended therethrough, a cap on the upper end of said nipple, an elbow on the lower end of the nipple, a tube secured in said elbow, a closure associated with the free end of said tube, a resilient element adapted to sustain the tube in a normal position relative to the bar, a chamber at the lower end of the tube, a presser foot having an arm extended into said chamber and having a sliding and a pivotal movement relative thereto and adapted to block the exit therefrom by either of said movements.

8. In a seed planter, a frame, a tiltable supporting bar associated therewith, provided with a hole, a nipple of less diameter than said hole extended therethrough, a cap on the upper end of said nipple, an elbow on the lower end of the nipple, a tube secured in said elbow, a closure associated with the free end of said tube, a furrow opener adjustably secured on the lower end of the tube, and a resilient element adapted to sustain the tube in a normal position relative to the bar.

9. In a planter, a frame, a tiltable supporting bar associated therewith provided with a hole, a nipple of less diameter than said hole extended therethrough, a cap on the upper end of said nipple, an elbow on the lower end of said nipple, a tube secured in said elbow, a closure associated with the free end of said tube, a resilient element adapted to sustain the tube in a normal position relative to the bar, a chamber at the lower end of the tube, a presser foot having an arm extended into said chamber and having sliding and a pivotal movement relative thereto and adapted to block the exit therefrom by either of said movement, and a furrow opener adjustably secured on the lower end of the tube.

10. In a seed planter, a frame, a seed tube supported thereby and a closure associated with the lower end of said tube and adapted to be actuated by contact with the ground to permit egress of seed from the tube during forward movement of the planter and to prevent egress of seed on backward movement of the planter.

11. In a seed planter, a seed tube carried thereby, a furrow opener comprising a rectangular bar adjustably associated with the lower end of said tube.

12. In a seed planter, a seed tube restricted at its lower end, a rectangular bar adjustably attached to and extended from the lower end of said tube in such relationship thereto that a corner of the bar will contact with the ground.

13. In a seed planter, a seed tube constricted at its lower end, a rectangular bar adjustably attached to and extended from the lower end of said tube in such relationship thereto that a corner of the bar will contact with the ground, a presser foot having an arm extended into the restricted portion of the tube and having a sliding and a pivotal movement therein and adapted to block the exit therefrom by either of said movements.

14. In a seed planter, a frame, a seed delivery tube carried thereby and capable of universal movement relative thereto, means for biasing said tube in a normal position, a closure associated with the free end of the tube adapted to be actuated by contact with the ground to permit egress of seed therefrom during forward movement of the planter and to prevent egress thereof on backward movement of the planter.

15. A seed planter, a seed tube carried thereby, a covering device associated therewith and adapted to be actuated upon backward movement of the planter to close the end of the tube and prevent the entrance of soil thereinto.

16. A seed planter, a seed tube carried thereby, a closure associated therewith and adapted to be opened upon forward movement of the planter and to be closed upon backward movement thereof.

17. A seed planter, a seed tube carried thereby, the lower end of which, in operation, is in proximity to the ground, means associated with said tube and adapted to be actuated by backward movement of the planter to close the end of the tube and prevent the entrance of soil thereinto during said backward movement.

18. A seed planter, a seed tube carried thereby, the lower end of which is in proximity to the ground, means associated with said tube and adapted to be actuated by contact with the ground upon backward movement of the seed planter to close the end of the tube and prevent the entrance of soil thereinto.

19. A seed planter, a seed tube carried thereby, said tube being constricted at its lower end, a presser foot having an arm extending into said tube and having a sliding and pivotal movement therein and adapted to block the entrance thereinto by either of said movements.

20. A seed planter, a seed tube carried thereby, a presser foot associated with the lower end thereof and movable relative thereto and adapted to block the entrance thereinto upon retrograde movement of the planter.

21. In a seed planter, a seed tube carried thereby and an angular bar adjustably associated with and extended from the lower end of said tube in such relationship thereto that a corner of the bar will contact with the ground.

22. A seed planter, a seed tube carried thereby, a closure associated with the lower end of said tube and adapted to be opened by contact with the ground upon forward movement of the planter and closed thereby by retrograde movement of the planter.

ORVILLE H. DODD.